United States Patent [19]

Terashima

[11] Patent Number: 4,473,347

[45] Date of Patent: Sep. 25, 1984

[54] DEVICE FOR PREVENTING THE LEAKAGE OF A MOLTEN MATERIAL REMAINING IN THE MOLD

[76] Inventor: Katsumi Terashima, 3-14, Kobayashigute, Sasamecho, Anjyoshi, Aichiken, Japan

[21] Appl. No.: 427,327

[22] Filed: Sep. 29, 1982

[30] Foreign Application Priority Data

Nov. 1, 1981 [JP] Japan ............................. 56-164109[U]
Nov. 1, 1981 [JP] Japan ............................. 56-164110[U]

[51] Int. Cl.³ ................................................ B29F 1/05
[52] U.S. Cl. ...................................... 425/562; 425/564
[58] Field of Search ................. 425/562, 564; 251/212

[56] References Cited

U.S. PATENT DOCUMENTS 3,370,610 2/1968 Miner ............................... 251/212 X
3,599,290 8/1971 Garner .............................. 425/562 X
4,193,574 3/1980 Barnes ............................... 251/212 X

*Primary Examiner*—Thomas P. Pavelko
*Attorney, Agent, or Firm*—Jordan and Hamburg

[57] ABSTRACT

A device for preventing the leakage of a molten material remaining in the mold through the gate, the device including a specially designed valve members movable in opposite directions so as to effect the communication of the sprue with the mold and to form a negative pressure chamber therebetween, the negative pressure chamber being adapted to suck a molten material remaining in the mold whereby the internal pressure is vacated from the passageways in the mold. This prevents the molten material from leaking through the gate. When the negative pressure chamber is closed, the sucked molten material therein is expelled into the passageways.

10 Claims, 8 Drawing Figures

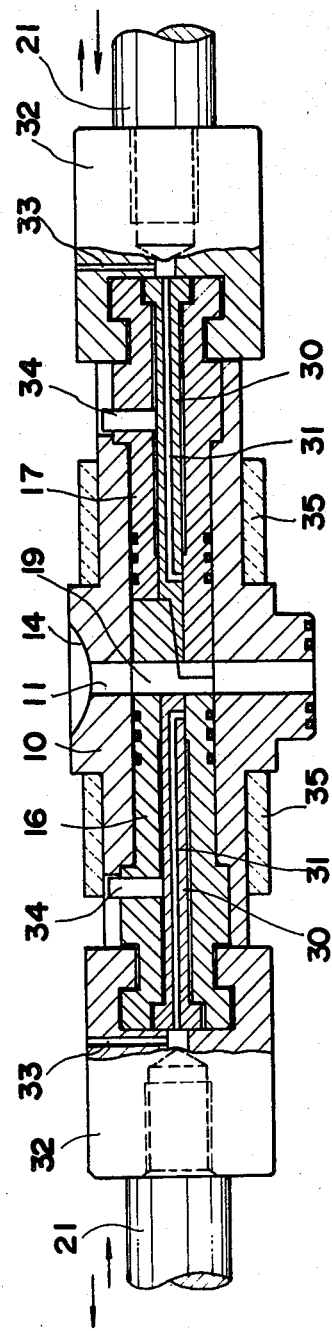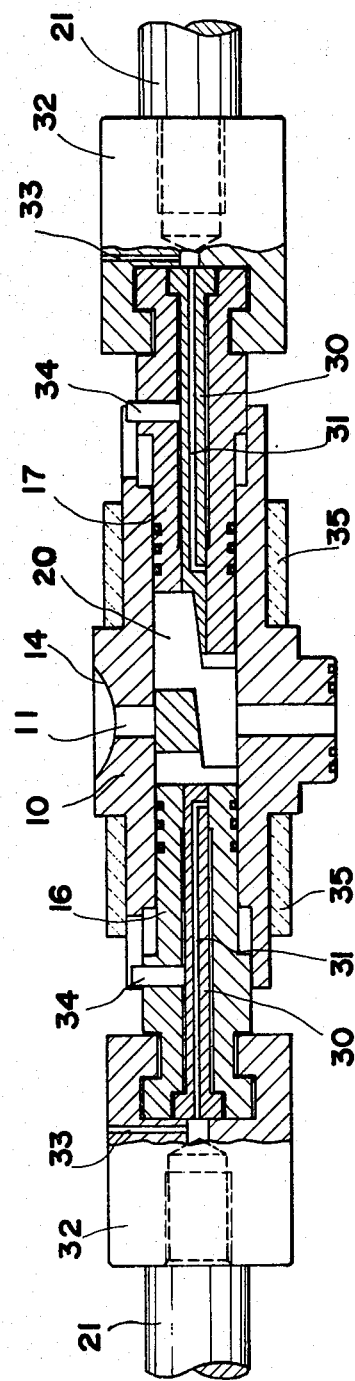

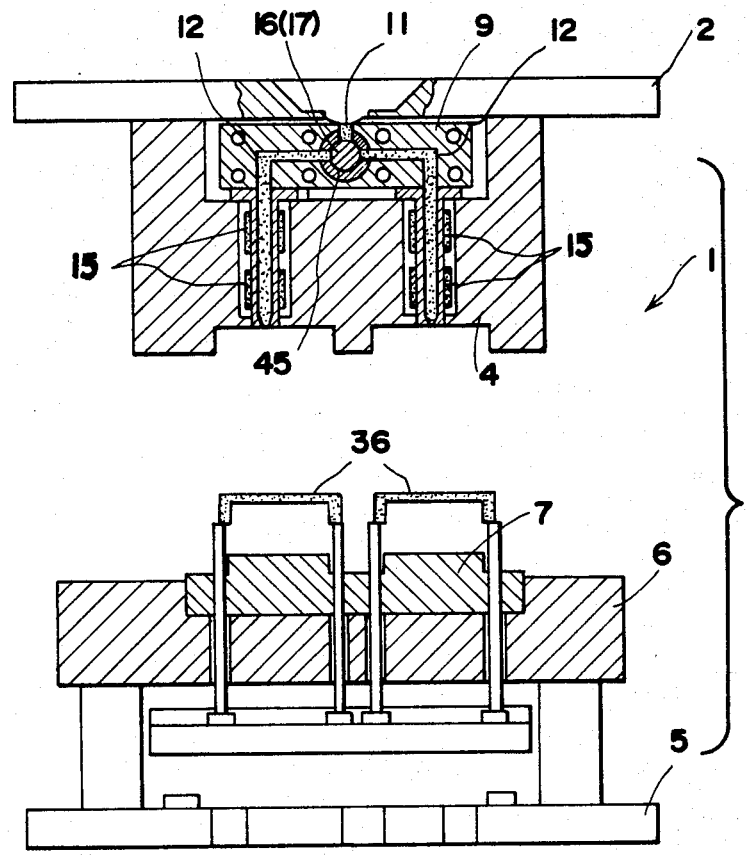

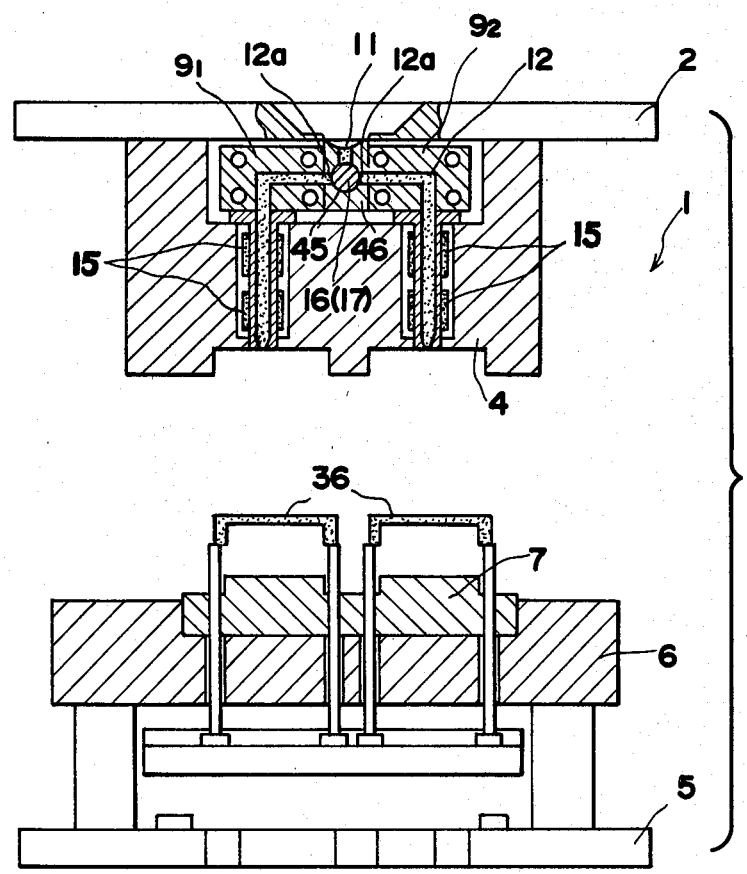

DEVICE FOR PREVENTING THE LEAKAGE OF A MOLTEN MATERIAL REMAINING IN THE MOLD

BACKGROUND OF THE INVENTION

The present invention relates to a device for preventing a possible leakage of a molten material remaining in the mold, and more particularly, to a device for preventing a possible leakage of a molten material in the mold through the gate.

In molding a molten material in a mold, it is known that the molten material remaining in the mold tends to leak through the gate, particularly under the recently developed runnerless system. The runnerless system is a contrivance for avoiding the waste of raw material and promoting lavor-saving. As generally known, the used sprues and runners are removed together with the molded products, and they are mostly discarded or pulverized for re-use. In the runnerless systems special valves are provided to prevent the leakage of a molten material through the gate, but this results in a complicated and expensive gate, which reflects in the price of the mold.

OBJECTS AND SUMMARY OF THE INVENTION

The present invention aims at solving the problems pointed out above with respect to the known practice of preventing the leakage of a molten material through the gate, and has for its object to provide an improved preventive device of molten material leakage through the gate, the feature essentially residing in a system in which the internal pressure is extracted from the passageways of a molten material leading from the sprue to the gate.

Other objects and advantages of the present invention will become more apparent from the following description when taken in connection to the accompanying drawings, which show, for the purpose of illustration only, a device for preventing the leakage of a molten material through the gate.

According to one advantageous aspect of the present invention there is provided a device for preventing the leakage of a molten material through the gate, which device includes a pair of valve members slidably provided in a passageway communicating with the sprue, the valve members being movable in opposite directions so as to meet together or become separated;

the valve members allowing a path to communicate with the sprue when they are met together; and the valve members allowing a negative pressure chamber to be formed therebetween when they become separated, and simultaneously, blocking the path against the sprue, wherein the negative pressure chamber is communicated with the sprue at the side of the gate.

As a result, a molten material remaining in the mold is sucked into the negative pressure chamber timely formed by the valve members, whereby the internal pressure in the passageways from the sprue to the gate is vacated together with the sucked molten material. This effectively prevents the remaining molten material from leaking through the gate. When the negative pressure chamber is closed, the molten material sucked therein is expelled in the passageways.

BRIEF EXPLANATION OF THE DRAWINGS

FIG. 3 is a cross-sectional view on an enlarged scale showing the sprue bush incorporated in the device of FIG. 1;

FIG. 4 is a cross-sectional view on an enlarged scale showing the sprue bush of FIG. 3, when the valve members are opened;

FIG. 7 is a cross-sectional view showing a further modified version of the embodiment, in which the valve members are located in the runner block; and FIG. 8 is a cross-sectional view showing a modified version of the embodiment of FIG. 7, in which the runner block is dividable into two portions.

DETAILED DESCRIPTION OF THE INVENTION

Figure 1:
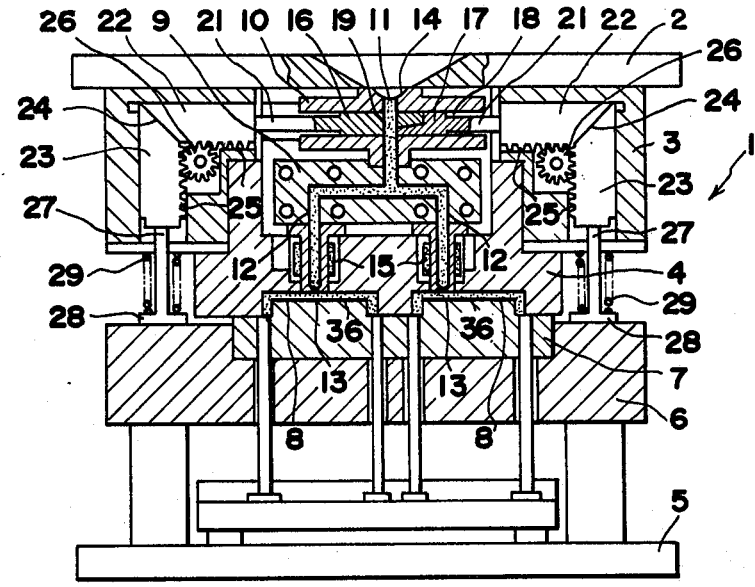
FIG. 1 is a cross-sectional view showing a device for preventing the leakage of a molten material according to the present invention.

Referring to the device illustrated in FIGS. 1 and 2, an injection mold 1 (hereinafter referred to merely as a mold) includes a fixed mold member 4 secured to a fixed mounting plate 2 through a an upper support 3, and a movable mold member 7 secured to a movable mounting plate 5 through a lower support 6. A cavity 8 is provided between the fixed and movable mold members 4 and 7.

The fixed mold member 4 has a runner block 9 and a sprue bush 10 in its upper section, wherein the sprue bush 10 has a sprue 11 communicating with the cavity 8 via a runner 12 and a gate 13. The sprue 11 is open in a nozzle abutment 14 with which an injection nozzle (not shown) is placed into contact. The runner block 9 is constantly heated by a heater 15 so as to keep the molding material in a fluid state.

The sprue bush 10 has a bore 18 produced transversely of the sprue 11, and separable valve members 16, 17 are slidably provided in the bore 18. The valve members 16, 17 as a whole are cylindrical and coaxial, divided by a slant surface. When the valve members 16, 17 are met with no gap therebetween, a path 19 is communicated with the sprue 11, thereby allowing a supplied molten material to be introduced into the mold 1. After the molten material has been supplied to the mold 1, the valve members 16, 17 are separated as shown in FIG. 2, thereby causing the valve member 16 to block the sprue 11. Simultaneously, there is formed a chamber 20, hereinafter referred to a negative pressure chamber, between the separated valve members 16, 17. The negative pressure chamber 20 is communicated with the passageway of the sprue 11 leading to the gate 13.

The valve members 16, 17 are operated in various manners, and one example of the manners will be explained with reference to FIGS. 1 and 2.

The mechanism for driving the valve members 16, 17 consists of two sections, which are substantially the same in construction and function. Therefore, the explanation will be given only with respect to the valve member 17 for simplicity.

The valve member 17 includes a rod 21 at its tail portion through which it is coupled to a first slider 22. The first slider 22 is coupled to a second slider 23 with their axes intersecting at right angle, wherein they are bordered by a slant cam face 24 formed on each end. Each slider 22, 23 can slide along the inner sides of the upper support 3, and to effect the sliding the sliders 22, 23 have toothed sides adapted to engage with a common pinion 26, wherein the toothed sides are intended to function as racks. The second slider 23 includes a rod 27 at its tail portion, which projects downward through the upper support 3. The rod 27 includes an abutment plate 28 with which the lower support 6 comes into abutment when the lower support 6 is ascended to close the mold, which will be hereinafter described in greater detail.

There is provided a spring 29 between the upper support 3 and the abutment plate 28, so as to urge the second slider 23 downward. When the second slider 23 is descended under the action of the spring 29, the first slider 22 is moved outward, in the direction in which the valve members 16, 17 are separated or opened. The second slider 23 normally takes a descended position under the action of the spring 29, which means that the valve members 16, 17 are normally opened.

Referring to FIGS. 3 and 4, the operation of the valve members 16, 17 will be explained.

Each valve member 16, 17 has a gas escape pin 30 axially provided, the gas escape pin 30 including a gas escape passageway 31 communicating with an outlet 33 produced in a coupler 32. The outlet 33 permits a gas generated in the negative pressure chamber 20 to escape therethrough. The gas is generated due to the difference in pressure occurring when the remaining molten material is sucked into the negative pressure chamber 20 from the passageways leaing from the sprue to the gate. The reference numerals 34 and 35 designate knock pins for positioning use, and heaters, respectively.

In operation, when a molten material is injected through the nozzle (not shown) of an injection machine (not shown), the valve members 16, 17 are closed with each second slider 23 taking its ascended position against the spring 29. As evident from FIG. 1, each abutment plate 28 is pushed upward by the lower support 6, thereby causing the second sliders 23 to rise up against the springs 29. As the two valve members 16, 17 are closed, the path 19 is communicated with the sprue 11, thereby allowing the injected molten material to flow into the cavity 8 through the sprue 11, the runner 12 and the gate 13. When the molten material becomes solid in the mold after it was allowed to cool, the mold 1 is opened so as to enable the molded product 36 to be taken out as shown in FIG. 2. The second sliders 23 lose the support provided by the lower support 6, and are caused to descend under the urge by the springs 29. As described above, the first sliders 22 are caused to move outward in accordance with the descending of the second sliders 23. In this way the valve members 16, 17 are separated or opened, thereby blocking the path 19. The supply of the molten material is stopped against the sprue 11, and simultaneously, the negative pressure chamber 20 is formed. The negative pressure chamber 20 communicates with the sprue 11 at the side of the gate 13, and sucks a molten material remaining in the sprue 11, the runner 12 and the gate 13. In sucking a remaining molten material the internal pressure in all the passageways is vacated, and the remaining molten material is prevented from leaking through the gate 13 by virtue of the surface tension.

Figure 2:
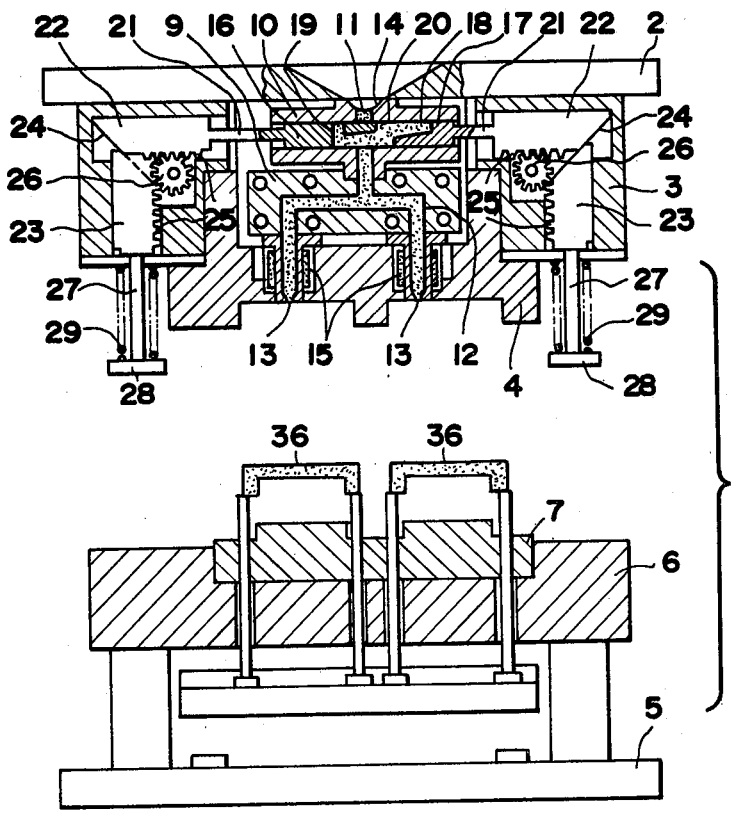
FIG. 2 is a cross-sectional view showing the device in FIG. 1, when the mold is opened.

After the molded product 36 is taken out from the mold 1, the mold 1 is closed for the subsequent operation as shown in FIG. 1. The lower support 6 is ascended during which it comes into abutment with the second sliders 23, thereby causing them to ascend against the springs 29. In this way the valve members 16, 17 are closed. A fresh supply of a molten material is made ready. At this stage, the negative pressure chamber 20 is also closed, thereby expelling the sucked molten material into the sprue 11, and enabling the path 19 to communicate with the sprue 11 at the side of the injection nozzle. In this way the same procedure is repeated.

When the mold 1 is of a small scale, with small sprue, runner and gate, it is not necessary to move both the valve members 16, 17 but the valve member 16 alone can be moved while the valve member 17 is kept motionless. In this case, the amount of the remaining molten material is little, and it is not necessary to form a large space of negative pressure chamber 20.

In the afore-mentioned embodiment the valve members 16, 17 are moved in accordance with the movement of the first and second sliders 22, 23 urged by the lower support 6, but they can be moved by means of a power cylinder, such as a pneumatic or hydraulic cylinder.

Figure 5:
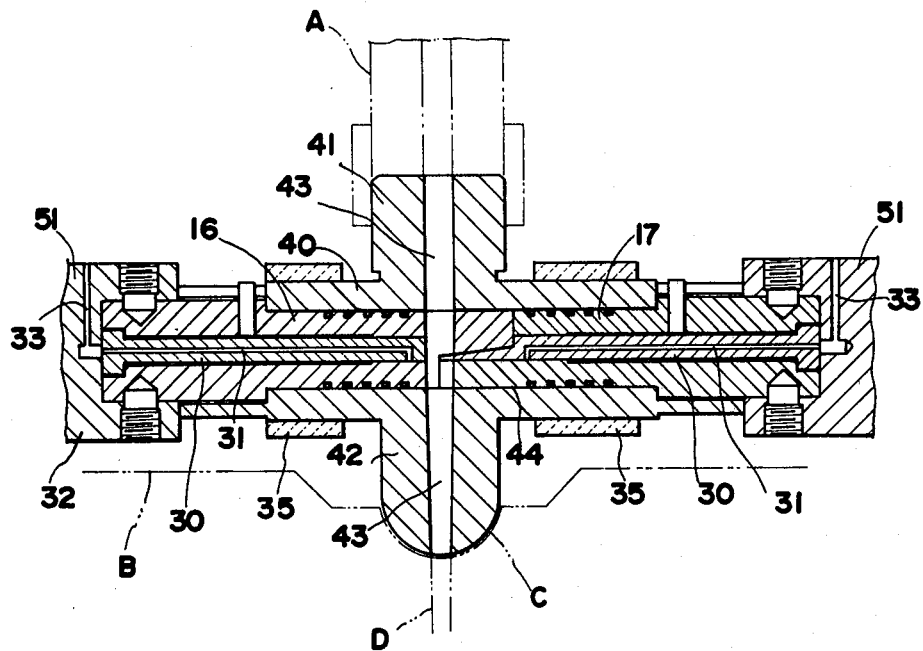
FIG. 5 is a cross-sectional view showing a modified version of the embodiment according to the present invention.
Figure 6:
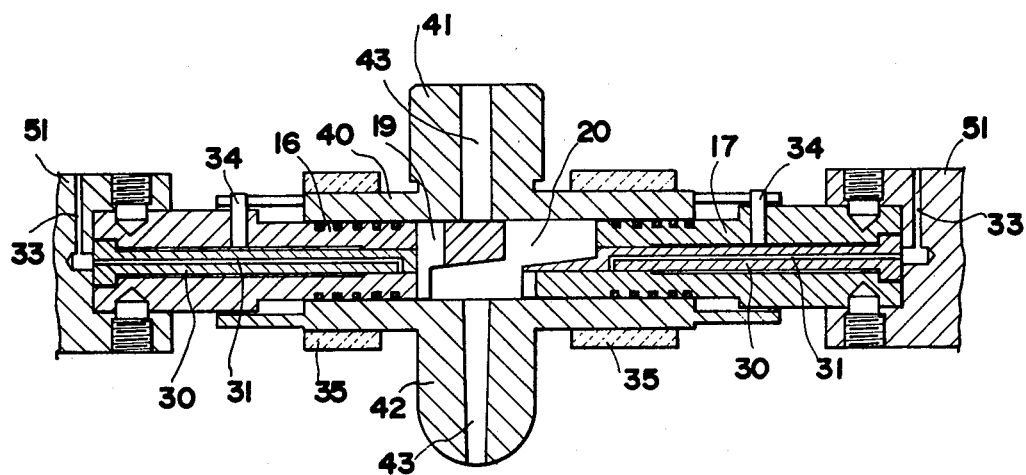
FIG. 6 is a cross-sectional view showing the device of FIG. 5, when the valve members are opened.

Referring to FIGS. 5 and 6 a modified version of the embodiment will be described.

The valve members 16, 17 are constituted as an attachment, which is detachably coupled to an injection nozzle (A). The valve members 16, 17 are accommodated in a body 40 having a coupler 41 at the middle section thereof, the coupler 41 being adapted to be coupled to the nozzle (A). The body 40 has a projection 42 at the opposite side of the coupler 41, the projection 42 being adapted to come into abutment with a nozzle accepting face (C) of a mold (B). A sprue 43 is formed to pass through the coupler 41 and the projection 42 so as to permit of a molten material supply from the nozzle (A) to an inlet (D) of the mold (B). The valve members 16, 17 are transversely of the sprue 43 and slidably provided in a bore 44 axially produced in the body 40. Each valve member 16, 17 is coupled to a piston rod 51 of a power cylinder, such as a pneumatic or hydraulic cylinder, whereby each valve member 16, 17 is moved outward or inward.

FIGS. 7 and 8 show a further modified version of the embodiment in which the valve members 16, 17 are built in the runner block 9. However, there is a slight difference between the embodiments illustrated in FIGS. 7 and 8. In the device of FIG. 7 the runner block 9 includes the sprue 11, and also a bore 45 produced transversely of the sprue 11, which bore 45 includes the valve members 16, 17. In the device of FIG. 8 there is provided a block 46 located at the junction 12a of the sprue 11 and the runner 12, and the bore 45 is produced in the block 46 transversely of the sprue 11. The valve members 16, 17 are accommodated in the bore 45 so as to constitute a valve unit. The runner block 9 is divided into two portion $9_1$, $9_2$ between which the valve unit is insertedly located like a sandwich. The advantage of incorporating the valve members 16, 17 in the runner block 9 is that the sprue bush 10 (FIGS. 1 to 4) can be dispensed with, thereby shortening the height of the mold 1. This will be of advantage when the maximum height of the mold is limited.

As evident from the foregoing description, according to the present invention a molten material remaining in the passageways from the sprue to the gate is sucked into the negative pressure chamber 20 timely formed by the movable valve members, whereby the internal pressure therein is equally vacated together with the sucked molten material. This effectively prevents the molten material from leaking through the gate. The remaining molten material sucked into the negative pressure chamber 20 is expelled into the passageways when the chamber 20 is closed.

Unlike the known runnerless systems it is not necessary to provide a complicated valve mechanism at the gate, thereby making the manufacturing of molds easy and accessible.

According to the present invention, the preventive device of molten material leakage can be manufactured as a separate unit of the mold, and the unit can be detachably attached to the injection nozzle in a ready, accessible manner. Even if the device is incorporated in the mold, it is possible to incorporate it in the sprue bush or alternatively in the runner block in accordance with the size of the mold and the inside permissible space therein.

What is claimed is:

1. A device for preventing the leakage of a molten material remaining in a sprue in a mold comprising, a valve assembly disposed in said mold and having a bore in the mold and at least one valve member slidably situated in said bore with an opening therein, said valve assembly being located in the sprue to thereby divide the sprue into an inlet zone and an inner zone so that when the molten material is injected into the mold, said valve member is fully situated in said bore to permit the molten material to pass from the inlet zone to the inner zone through the opening of the valve member, and when the molded material is removed from the mold, the valve member is moved to thereby close the inlet zone by means of said valve member and to form a negative pressure chamber in the bore, whereby the molten material in the inner zone is sucked into the negative pressure chamber to prevent the leakage of the molten material from the sprue.

2. A device according to claim 1, in which said mold comprises upper and lower mold members, and a mold cavity situated between the upper and lower mold members, said valve assembly being situated in said upper mold member.

3. A device according to claim 2, in which said mold further comprises at least one slider connected to said valve member and one spring connected to the slider to urge the valve member into an inlet zone closing condition, said valve member being moved by said spring to close the inlet zone when said upper mold member is moved to remove the molded material in the mold cavity.

4. A device according to claim 2, in which said valve assembly comprises a pair of valve members to be moved in the bore in opposition directions to each other when the inlet zone is closed, and said mold further comprises sliders connected to each valve member and springs connected to each slider to urge the respective valve members away from each other to thereby close the inlet zone, said valve members being moved by said springs to close the inlet zone and form the nagative pressure chamber when the upper mold member is moved upwardly to remove the molded material in the mold cavity.

5. A device according to claim 4, in which each said valve member includes a gas escape passage therein to permit escape of gas in the negative pressure chamber to outside the mold.

6. A device according to claim 1, in which said mold includes a sprue bush, said valve assembly being situated in said sprue bush.

7. A device according to claim 1, in which said mold includes a runner block, said valve assembly being situated in said runner block.

8. A device for preventing the leakage of a molten material remaining in a sprue in a mold comprising, an attachment connected to the mold and having an attachment sprue, said attachment sprue being in communication with the sprue in the mold, and a valve assembly disposed in said attachment and having a bore in the attachment and at least one valve member slidably situated in said bore with an opening therein, said valve assembly being located in the attachment sprue to thereby divide the attachment sprue into an inlet zone and an outlet zone communicating with the sprue in the mold so that when the molten material is injected into the mold, said valve member is fully situated in said bore to permit the molten material to pass from the inlet zone to the outlet zone through the opening of the valve member, and when the molded material is removed from the mold, the valve member is moved to thereby close the inlet zone by means of said valve member and to form a negative pressure chamber in the bore, whereby the molten material in the outlet zone and the sprue in the mold is sucked into the negative pressure chamber to prevent the leakage of the molten material from the sprue in the mold.

9. A device according to claim 8, in which said valve assembly comprises a pair of valve members to be moved in the bore in opposition directions to each other when the inlet zone is closed, and said attachment further comprises sliders connected to each valve member and springs connected to each slider to urge the respective valve members away from each other to thereby close the inlet zone, said valve members being moved by said springs to close the inlet zone and form the negative pressure chamber when the molded material is removed from the mold.

10. A device according to claim 9, in which each said valve member includes a gas escape passage therein to permit escape of gas in the negative pressure chamber to outside the mold.

* * * * *